United States Patent
Erkfeldt

(10) Patent No.: US 9,181,832 B2
(45) Date of Patent: Nov. 10, 2015

(54) EXHAUST AFTERTREATMENT SYSTEM WHERE AN ACTIVATOR MATERIAL IS ADDED TO THE REDUCTANT FED TO THE CATALYTIC CONVERTER

(75) Inventor: Sara Erkfeldt, Hovás (SE)

(73) Assignee: Volvo Technology Corporation, Göteborg (SE)

( * ) Notice: Subject to any disclaimer, the term of this patent is extended or adjusted under 35 U.S.C. 154(b) by 0 days.

(21) Appl. No.: 14/006,663

(22) PCT Filed: Mar. 21, 2011

(86) PCT No.: PCT/SE2011/000052
§ 371 (c)(1),
(2), (4) Date: Sep. 30, 2013

(87) PCT Pub. No.: WO2012/128673
PCT Pub. Date: Sep. 27, 2012

(65) Prior Publication Data
US 2014/0318102 A1      Oct. 30, 2014

(51) Int. Cl.
*F01N 3/36* (2006.01)
*F01N 3/18* (2006.01)
(Continued)

(52) U.S. Cl.
CPC *F01N 3/18* (2013.01); *B01D 53/90* (2013.01); *B01D 53/9431* (2013.01);
(Continued)

(58) Field of Classification Search
CPC ......... F01N 3/208; F01N 3/2896; F01N 3/36; F01N 2610/01; F01N 2610/03; F01N 2610/1406; F01N 2610/146; F01N 2900/1402; F01N 2900/1404; F01N 2900/1602
USPC .................... 60/274, 285, 286, 295, 301, 303
See application file for complete search history.

(56) References Cited

U.S. PATENT DOCUMENTS

| 8,156,731 B2 | 4/2012 | Yoshida et al. |
| 2007/0068144 A1 | 3/2007 | Iwase et al. |

(Continued)

FOREIGN PATENT DOCUMENTS

| CN | 101275480 A | 3/2008 |
| DE | 19859201 A1 | 6/2000 |

(Continued)

OTHER PUBLICATIONS

International Search Report (Nov. 30, 2011) for corresponding Intenrational Application PCT/SE2011/000052.

(Continued)

*Primary Examiner* — Thomas Denion
*Assistant Examiner* — Jorge Leon, Jr.
(74) *Attorney, Agent, or Firm* — WRB-IP LLP

(57) ABSTRACT

An exhaust gas after treatment system includes a catalytic converter arrangement with at least one catalytic material, wherein the catalytic converter arrangement is arranged in an exhaust gas path downstream of a combustion engine, and further includes one or more dosing interfaces for feeding at least one reducing agent for reducing an $NO_x$ content in the exhaust gas. The one or more dosing interfaces are arranged to feed at least one activator material to the exhaust gas. The activator material causes an enhancement of a catalytic activity of the catalytic material compared to the catalytic activity of the catalytic material without the presence of the activator material at least in a given temperature range.

9 Claims, 3 Drawing Sheets

(51) Int. Cl.
*F01N 3/20* (2006.01)
*B01D 53/90* (2006.01)
*F01N 3/28* (2006.01)
*B01D 53/94* (2006.01)

(52) U.S. Cl.
CPC ............ *F01N 3/208* (2013.01); *F01N 3/2066* (2013.01); *B01D 53/9418* (2013.01); *B01D 2251/208* (2013.01); *B01D 2251/21* (2013.01); *B01D 2252/2025* (2013.01); *B01D 2255/104* (2013.01); *B01D 2255/106* (2013.01); *B01D 2255/1021* (2013.01); *B01D 2255/1023* (2013.01); *B01D 2255/1025* (2013.01); *F01N 3/2896* (2013.01); *F01N 3/36* (2013.01); *F01N 2610/01* (2013.01); *F01N 2610/03* (2013.01); *F01N 2610/1406* (2013.01); *F01N 2610/146* (2013.01); *F01N 2900/1402* (2013.01); *F01N 2900/1404* (2013.01); *F01N 2900/1602* (2013.01); *Y02T 10/24* (2013.01)

(56) References Cited

U.S. PATENT DOCUMENTS

| | | | |
|---|---|---|---|
| 2007/0289291 A1 | 12/2007 | Rabinovich et al. | |
| 2008/0053073 A1* | 3/2008 | Kalyanaraman et al. | 60/286 |
| 2008/0066455 A1* | 3/2008 | Viola | 60/286 |
| 2008/0271438 A1* | 11/2008 | Hinz et al. | 60/286 |
| 2009/0173061 A1 | 7/2009 | Vitse et al. | |
| 2010/0126143 A1* | 5/2010 | Cho | 60/286 |
| 2011/0023455 A1 | 2/2011 | Lee et al. | |
| 2011/0078997 A1* | 4/2011 | Boorse et al. | 60/274 |

FOREIGN PATENT DOCUMENTS

| | | |
|---|---|---|
| EP | 0788829 A1 | 8/1997 |
| EP | 1974799 A2 | 10/2008 |
| JP | 08084912 | 4/1996 |
| JP | 2001020723 | 1/2001 |
| JP | 2007007607 | 1/2007 |
| WO | 9939809 A1 | 8/1999 |

OTHER PUBLICATIONS

Supplementary European Search Report (Jul. 15, 2014) for corresponding European App. EP 11 86 1388.

Chinese Official Action (Aug. 3, 2015) from corresponding Chinese Application 201180069462.3.

Japanese Official Action (translation) (Feb. 26, 2015) from corresponding Japanese Application 2014-501032.

* cited by examiner

EXHAUST AFTERTREATMENT SYSTEM WHERE AN ACTIVATOR MATERIAL IS ADDED TO THE REDUCTANT FED TO THE CATALYTIC CONVERTER

BACKGROUND AND SUMMARY

The invention relates to an exhaust gas after treatment system and a method for treating an exhaust gas in an exhaust gas after treatment system as well as a vehicle with an exhaust gas after treatment system.

Present regulatory conditions in the automotive market have led to an increasing demand to improve fuel economy and reduce emissions in present vehicles. These regulatory conditions must be balanced with the demands of a consumer for high performance and quick response for a vehicle.

A diesel engine has an efficiency of up to about 52% and is thus the best converter of fossil energy. NOx emission concentration, i.e. the emission of nitrogen oxides NO and NO2, is dependent upon local oxygen atom concentration and the local temperature in the combustion process in the engine. Said high engine efficiency is however only possible at an elevated combustion temperature at which high NOx levels are inevitable.

Moreover, a suppression of NOx formation by internal means (such as a specific air/fuel ratio) has the tendency to cause an increase in particulates, known as the NOx-particulates trade off. Furthermore, an excess of oxygen in the exhaust gas from a diesel engine prevents the use of stoichiometric 3-way-catalyst technology for reduction of NOx as is used in gasoline engine cars from the late eighties of the last century.

Both carbon particulates and NOx are typical emissions in the exhaust gas of diesel engines. Requirements for reducing such emissions increase and trigger various approaches in the art to reduce emissions. In EP 1 054 722 B1 an exhaust after treatment system is disclosed which combines a particulate filter collecting soot and nitrogen-oxides reduction catalysts in the exhaust tract. For removing soot, NO2 is generated by oxidation of NO in an oxidation catalyst. Soot which is collected in a particulate filter is oxidized by NO2. Residual amounts of NO and NO2 in the exhaust gas are reduced to nitrogen gas in a Selective-Catalytic-Reduction (SCR) catalyst by injecting a 32% urea-water solution into the SCR catalyst. However, a large amount of this urea-water solution is needed and has to be fuelled and carried on-board in addition to the vehicle fuel. Moreover, urea may crystallize at lower temperatures, like −10° C., and thus the risk of plugging of the injector or similar devices is enhanced.

An alternative system to SCR by ammonia or urea is the SCR by hydrocarbons from the fuel. When the vehicle fuel is used as reducing agent a large additional tank for the reducing agent as in the case with SCR by ammonia or urea is avoided. However, the NOx conversion is generally lower than for SCR by ammonia or urea especially at lower temperatures and a large amount of hydrocarbon is needed. In US 2007/0289291 A1 the addition of hydrogen is shown to increase the NOx conversion with hydrocarbons at lower temperatures.

Hydrogen could either be carried on board the vehicle or extracted from the fuel. However, the former would require a large tank for the hydrogen and possibly additional safety measures and the latter a reformer system on board the vehicle.

Therefore, it is desirable to employ an exhaust gas after treatment system which operates with smaller amounts of deployed materials and is less failure-sensitive.

It is desirable to provide an improved exhaust after treatment system. It is also desirable to provide an adequate improved method for treating an exhaust gas in an improved exhaust gas after treatment system. It is also desirable to provide a vehicle with an improved exhaust gas after treatment system.

In a first aspect of the present invention it is provided an exhaust gas after treatment system comprising a catalytic converter arrangement with at least one catalytic material, wherein the catalytic converter arrangement is arranged in an exhaust gas path downstream of a combustion engine, and further comprising one or more dosing interfaces for feeding at least one reducing agent for reducing a NOx content in the exhaust gas, wherein the one or more dosing interfaces are arranged to feed at least one activator material to the exhaust gas, wherein the activator material causes an enhancement of a catalytic activity of the catalytic material compared to the catalytic activity of said catalytic material without the presence of the activator material at least in a given temperature range.

An advantage with the present invention is that a conversion over the catalytic material is increased, especially at low temperatures, compared to the catalytic reaction without the presence of the activator material, so that the active temperature range of the catalyst material is closer to the exhaust gas temperature than otherwise. Another advantage with the present invention is that a wide range of different catalytic materials can be used which results advantageously in a reduction of costs. Still another advantage of the present invention is that an alternative selective catalytic reduction process to the procedure with ammonia or urea can be maintained. This results in a reduction of an amount of reducing agent which had to be carried on board the vehicle as well as in a less failure-sensitive process due to alternative substances to urea and/or ammonia. Further, an unwanted emission of ammonia in case of unfavourable process conditions is avoided.

The catalytic converter arrangement can have one or several catalytic devices, like a NOx reducing catalyst, a soot removing component such as a catalyst or particulate filter or any component and/or catalyst which is feasible for a person skilled in the art. Furthermore, the catalytic devices may be arranged in any arbitrary order. In an expedient arrangement the NOx reducing catalyst is arranged downstream of the soot catalyst. Moreover, the one or more dosing interfaces may be arranged downstream of the combustion engine and upstream of the catalytic converter arrangement and particularly upstream of the NOx reducing catalyst. Further, the one or more dosing interfaces may comprise an injector, a nozzle, a vaporizer, an atomizer and/or any other interface which is feasible for a person skilled in the art. The reducing agent and the activator material may be applied via the same dosing interface or different interfaces and/or at the same time, as a mixture or temporally offset compared to each other. Particularly, they may be added via the same dosing interface into the exhaust gas as a mixture. The ratio of activator material to reducing agent can range from substantially 0 wt-% up to substantially 50 wt-% (wt-%=weight percent) and in extreme cases up to substantially 60 wt-% or even up to substantially 70 wt-%. Alternatively, it is also possible to apply the reducing agent in one or more cylinders of the combustion engine e.g. via post-injection. Expediently, the dosing interface for input of the activator material to the exhaust gas is arranged in, on or at the exhaust gas path downstream of the combustion engine.

The reducing agent is an independent component relative to the activator material. The activator material takes effect on the catalytic material and increases the efficiency of the catalytic material at lower temperatures compared to the efficiency without the presence of the activator material.

According to a favourable embodiment of the invention, the activator material can comprise at least one oxygenated hydrocarbon. Preferably the activator material consists of or comprises one oxygenated hydrocarbon. The amount of activator material which is added in one application process may be dependent on the temperature of the catalyst. The same may apply for the amount of the reducing agent. Generally speaking, at high temperatures of the catalyst the activator material has only a small effect on NOx conversion and is avoidable. Similarly, at low temperatures of the catalyst when the reducing agent and/or the activator material work inefficiently the reducing agent and/or the activator material may be not injected at all. In a certain temperature range in between these two temperature boundaries a mixture of reducing agent and activator material works best. Thus, at high temperatures of the catalyst the amount of added activator material could be reduced to substantially zero and at lower temperatures of the catalyst within the said temperature range it could go up to substantially 50 wt-% or in some extreme cases even higher up to substantially 60-70 wt-%. Hence, the mixture is favourably adjusted according to the temperature of the catalyst. Expediently, the amount of the mixture out of the activator material and the reducing agent added in one application process may depend on the amount of NOx. The amount of the mixture in respect to the NOx amount ranges from substantially 0.1:1 on weight basis up to substantially 10:1 and preferably from substantially 0.5:1 on weight basis up to substantially 5:1 and particularly advantageously from substantially 1:1 on weight basis up to substantially 3:1. The oxygenated hydrocarbon can have any state of aggregation which is feasible for a person skilled in the art and is preferably a fluid in the state of application. Therefore, cooling devices for the dosing interface may also be provided. Due to the invention the enhancement of the catalytic activity and efficiency of the catalytic material can be easily obtained.

According to another favourable embodiment of the invention the activator material may comprise at least one oxygenated hydrocarbon of ether type and preferably an ether out of a group consisting of or comprising: triglyme, diglyme, monoglyme, diethyl ether (DEE), dipropyl ether. By means of such a substance a material with known characteristics can be used.

In yet another example embodiment of the present invention the activator material may comprise at least triglyme. The amount of triglyme which is added in one application process depends, as stated above, on the temperature of the exhaust gas at the catalyst. Thus, a substance can be provided which is advantageously liquid in the state of handling and application to the exhaust gas. Additionally, triglyme is also liquid in a storage condition in the vehicle, which is typically in a range between −50° C. to +50° C. Therefore, accidental freezing or crystallization of the activator material could be prevented securely for the operating process of the vehicle. Consequently, a plugging of application devices like the dosing interfaces could be avoided. Additionally, costly heating devices to avoid e.g. freezing of the activator material could be dispensed. Furthermore, due to the liquid state of triglyme a mixture with an also liquid reducing agent is easy and efficient to produce and to handle. With triglyme as activator material, a smaller amount of substances which are applied in the form of the reducing agent and the activator material to the exhaust gas in the SCR process is needed compared with SCR by urea-water solution and corresponds approximately to a reduction of up to 50-80 wt-%.

In still another example embodiment according to the present invention the activator material can be injected via an injector. Due to this a constructively easy application can be provided.

According to another example embodiment the combustion engine may be a diesel engine, wherein the temperatures of the working condition of the activator material and the exhaust gas can be effortlessly combined and adjusted to each other. Thus, the inventive embodiments can easily compensate a lower combustion temperature of a diesel engine in comparison with a petrol or gasoline engine.

In another embodiment of the present invention the reducing agent for NOx reduction may comprise at least one hydrocarbon. Preferably, the reducing agent is a hydrocarbon. Due to this, a wide plurality of substances is possible and available.

It is further proposed that the reducing agent can be a fuel, especially a diesel fuel. The process can be understood as a selective catalytic reduction (SCR) with hydrocarbons in the fuel. Moreover, according to the invention adding a mixture of (i) triglyme or another similar compound and (ii) the hydrocarbons of the vehicle fuel to the exhaust gases in the exhaust line before the catalytic converter arrangement helps to further reduce the NOx content in the exhaust gases, particularly at lower temperatures. Further, due to the use of the fuel as reducing agent only an additional small container for the activator material is needed on board the vehicle.

Advantageously, the activator material may cause the enhancement of the catalytic activity of the catalytic material at least at a temperature of the exhaust gas in the temperature range of substantially 200° C. to 500° C. Compared to the case without the presence of the activator material, the temperature may be reduced by substantially 100° C. to substantially 200° C. As a result, a wide plurality of catalytic materials could be employed.

In yet another example embodiment the catalytic converter arrangement can comprise at least a noble metal as catalytic material, wherein a well known and established concept could be used. As a catalytic material all kinds of noble metals, like ruthenium, rhodium, palladium, silver, osmium, iridium, platinum and gold are feasible. Preferably, rhodium, palladium, platinum, gold and silver may be utilized.

In a preferred embodiment the catalytic material may be silver. The silver may be applied as an Ag/Al2O3-catalyst. Thus, a low cost metal could be employed which results in a correspondingly inexpensive exhaust gas after treatment system and, consequently, to this end a less expensive vehicle.

According to another example embodiment the exhaust gas after treatment system may comprise a feedback control to adjust the amount of activator material which is fed to the exhaust gas in respect to an amount of NOx in the exhaust gas. Additionally, the feedback control may adjust the amount of reducing agent fed to the exhaust gas in respect to the amount of NOx in the exhaust gas. Moreover, the feedback control may include the temperature of the exhaust gas and/or the catalyst in the adjustment of the amount of activator material and/or the reducing agent.

It is further proposed that the exhaust gas after treatment system may comprise a feedback control to adjust the amount of reducing agent and the amount of activator material which are fed to the exhaust gas in respect to a temperature of the exhaust gas and/or the catalyst and in respect to an amount of NOx in the exhaust gas. In particular the amount of activator material in relation to the reducing agent is preferably adjusted depending on the temperature of the exhaust gas and/or the catalyst. Preferably the feedback control can comprise sensor arrangement for detection of the NOx amount and the temperature. Due to this inventive embodiment a highly efficient exhaust gas after treatment system can be provided.

In a further aspect of the present invention a method for treating an exhaust gas in an exhaust gas after treatment system is provided, wherein a reducing agent is provided for reducing a NOx content in an exhaust gas of a combustion engine and wherein at least one activator material is added into the exhaust gas to cause an enhancement of a catalytic activity of a catalytic material of a catalytic converter arrangement compared to the catalytic activity without the presence of the activator material at least in a given temperature range.

Thus, a conversion efficiency over the catalytic material is advantageously increased, especially at low temperatures so that the active temperature range of the catalyst material corresponds better to the exhaust gas temperature. Further, a wide range of different catalytic materials could be helpfully used, which results profitably in a reduction of costs. Another advantage of the present invention is that an alternative selective catalytic reduction process to the SCR process using ammonia or urea can be used. This results in a reduction of an amount of reducing agent which had to be carried on board the vehicle as well as in a less failure-sensitive process due to alternative substances to ammonia or urea.

In a third aspect of the invention a vehicle is provided, particularly a truck, with at least one exhaust gas after treatment system. Consequently, the inventive exhaust gas after treatment system can be deployed in a field where highly sophisticated solutions are requested.

BRIEF DESCRIPTION OF THE DRAWINGS

The present invention together with the above-mentioned and other objects and advantages may best be understood from the following detailed description of the embodiment, but not restricted to the embodiment, wherein is shown schematically.

DETAILED DESCRIPTION

Figure 1:
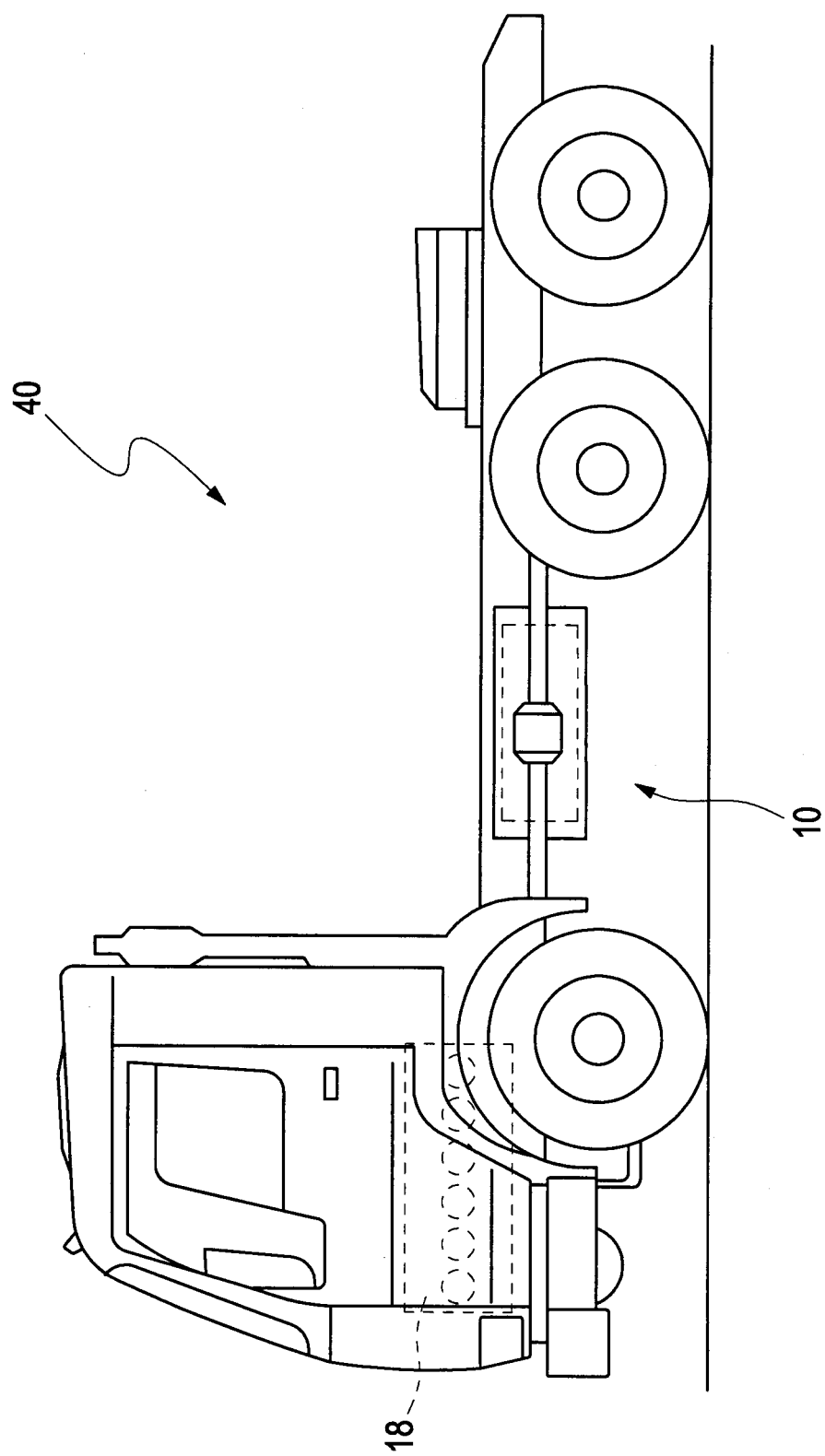
FIG. 1 a vehicle with a combustion engine and an example embodiment of an exhaust gas after treatment system according to the invention.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

Figure 2:
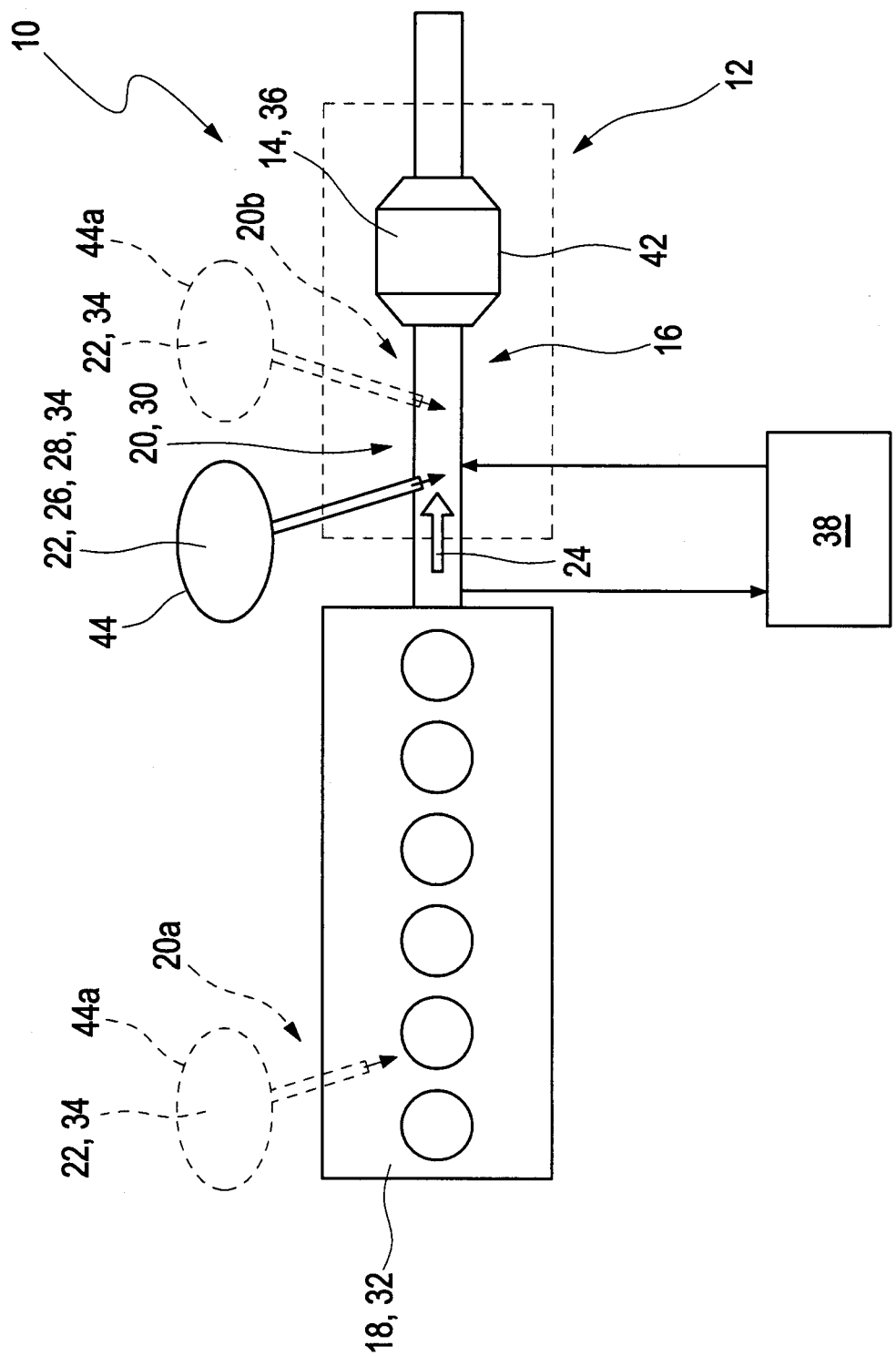
FIG. 2 the combustion engine and the exhaust gas after treatment system from FIG. 1 in a detailed illustration.

FIG. 1 depicts schematically a vehicle 40 with a combustion engine 18 and an exhaust gas after treatment system 10 downstream of the combustion engine 18. An example embodiment of the exhaust gas after treatment system is illustrated in detail in FIG. 2.

The exhaust gas after treatment system 10 comprises a catalytic converter arrangement 12 which is arranged in an exhaust gas path 16 or an exhaust pipe, respectively, downstream of the combustion engine 18, which is embodied as a diesel engine 32. The catalytic converter arrangement 12 comprises a component for reducing a soot content, such as a catalyst for soot reduction or a particulate filter (not shown) and a catalyst 42 for NOx reduction which comprises a catalytic material 14, embodied as the noble metal silver 36 in an Ag/Al2O3 catalyst.

The exhaust gas after treatment system 10 further comprises a dosing interface 20 in the form of an injector 30. The dosing interface 20 is arranged downstream of the combustion engine 18 and upstream of the catalytic converter arrangement 12. Further, the dosing interface 20 or the injector 30, respectively, feeds or injects a reducing agent 22 for NOx reduction into an exhaust gas 24 streaming from the combustion engine 18 along the exhaust gas path 16 to the catalytic converter arrangement 12. The reducing agent 22 for NOx reduction is by way of an example a hydrocarbon which is a component of fuel. Thus, the reducing agent 22 for NOx reduction is the fuel on board the vehicle, and in case of the diesel engine 32 correspondingly a diesel fuel 34.

The diesel fuel 34 is provided in a tank 44, which is connected to the injector 30, as a mixture with an activator material 26. Therefore, the dosing interface 20 is also arranged to feed the activator material 26 to the exhaust gas 24. The activator material 26 comprises by way of an example an oxygenated hydrocarbon and is in this example triglyme 28. Moreover, the activator material 26 is arranged to cause an enhancement of a catalytic activity of the catalytic material 14 compared to the catalytic activity without the presence of the activator material 26 at least in a given temperature range.

Alternatively, the reducing agent 22 and the activator material 26 could be fed to the exhaust gas 24 with different dosing interfaces 20, 20a, 20b. Therefore, in such an alternative embodiment, tank 44 contains only the activator material 26 or triglyme 28, respectively, and the activator material 26 is injected via dosing interface 20 or injector 30. The process of mixing of the reducing agent 22 and the activator material 26 occurs in the presence of the exhaust gas 24. The reducing agent 22 however, is stored in tank 44a, which is the regular tank for the diesel fuel 34 for operating the vehicle 40 (FIG. 1).

In a first alternative embodiment the reducing agent 22 or diesel fuel 34, respectively, is injected via dosing interface 20a, which is arranged at the combustion engine 8 for post-injection of the reducing agent 22 in at least one cylinder of the combustion engine 18.

In a second alternative embodiment the reducing agent 22 or diesel fuel 34, respectively, is injected into the exhaust gas 24 of the exhaust gas path 16 via dosing interface 20b, which is arranged downstream of the combustion engine 18 and upstream of the catalytic converter arrangement 12.

In a third alternative embodiment the reducing agent 22 or diesel fuel 34, respectively, is injected into the exhaust gas 24 via dosing interfaces 20a and 20b.

Moreover, the exhaust gas after treatment system 10 comprises a feedback control 38, comprising sensors and a processing unit (not shown in detail), to adjust the amount of reducing agent 22 and activator material 26 which should be fed to the exhaust gas 24 for sufficient activation of the catalytic material 14. For an adjustment of the ratio of the amount of activator material 26 and the reducing agent 22 to a desired value a temperature of the exhaust gas 24 or of the catalyst 42 is measured with a first sensor (not shown). The processing unit 38 determines a needed ratio of the reducing agent 22 and the activator material 26 in dependence of the temperature measurement results. A resulting mixture of reducing agent 22 and activator material 26 is mixed and stored in tank 44. Thus, in this embodiment an additional tank for storage of the activator material 26 is needed (not shown). In the alternative embodiments with tank 44a as storage tank for the reducing agent 22 the process of mixing of the reducing agent 22 and the activator material 26 occurs directly in the presence of the exhaust gas 24 (in the cylinder(s) of the combustion engine 18 and/or the exhaust gas path 16).

A desired or required amount of the resulting mixture out of reducing agent 22 and activator material 26 is dependent on the amount of NOx in the exhaust gas 24, which is detected via a second sensor (not shown). Thus, the processing unit 38 calculates the needed amount of mixture of the reducing agent 22 and the activator material 26 and the composition of said mixture based on the measured NOx amount. The resulting mixture of reducing agent 22 and activator material 26, which is injected to the exhaust gas 24 via the injector 30, has relative to the amount of NOx on weight basis a range approximately from 1:1 to 3:1.

Further, the activator material 26 in the mixture enhances the catalytic activity or the efficiency of the catalytic material 14 of the catalytic converter arrangement 12 at a temperature of the exhaust gas 24 in a temperature range of substantially 200° C. to 500° C. (see also FIG. 3). Thus, the catalytic material 14 is even able to operate at a temperature lower than substantially 250° C. Therefore, the reducing agent 22, or the hydrocarbons in the diesel fuel 34, respectively, fed into the exhaust gas 24 can perform a selective catalytic reduction (SCR) for the reduction of the amount of NOx in the exhaust gas 24. Consequently, the addition of a small amount of triglyme 28 increases the conversion over the Ag/Al2O3-based catalysts 42, especially at low temperatures of the exhaust gas 24 and/or the catalyst 42 so that the active temperature range of the catalyst 42 corresponds better to the exhaust gas temperature.

Figure 3:
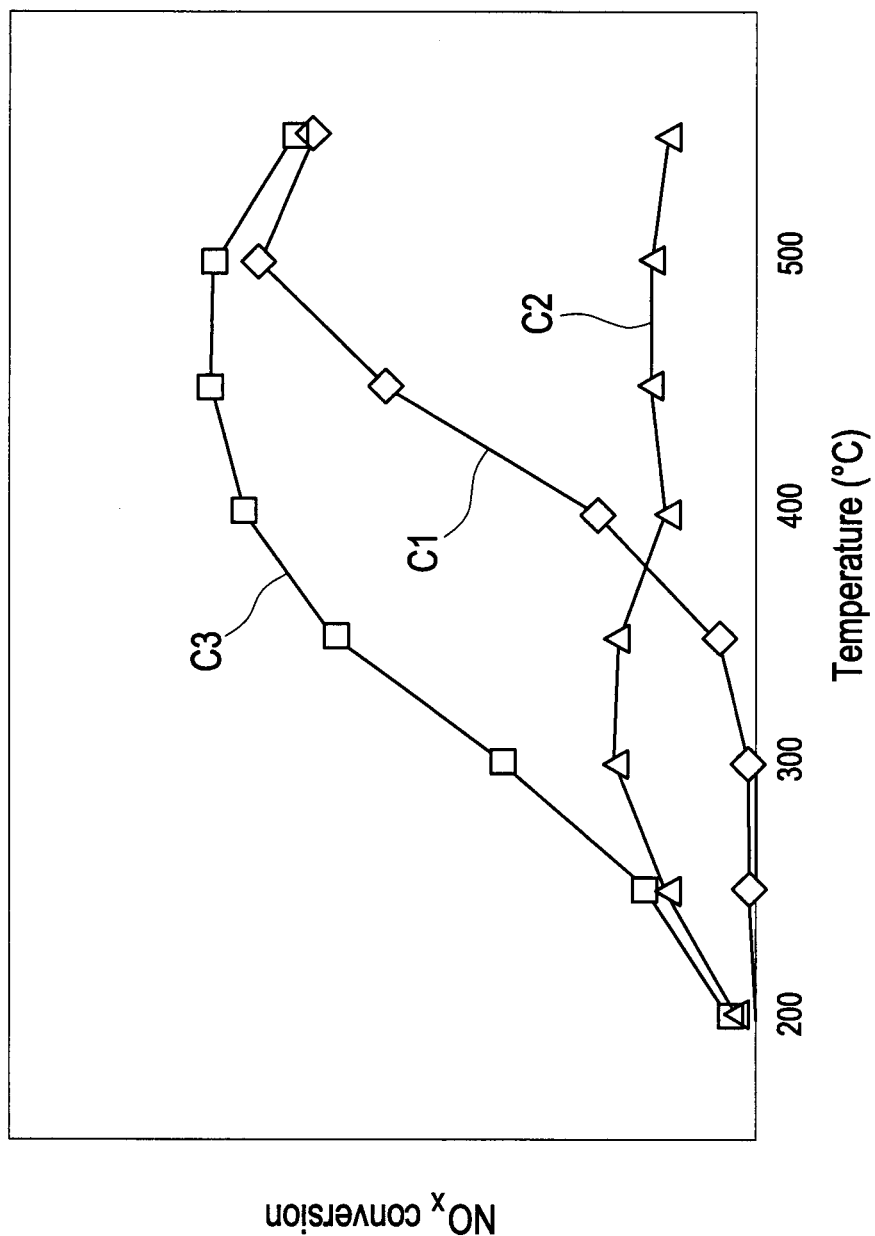
FIG. 3 an exemplary diagram depicting the results of three different experimental setups.

FIG. 3 shows in a diagram the results of three different experimental setups of a exhaust gas after treatment system with the addition of three different additives, namely, a hydrocarbon (graph C1), an ether (graph C2) and a mixture of a hydrocarbon and an ether (e.g. 20 wt-%; graph C3). The y-axis refers to NOx conversion, and on the x-axis the temperature in ° C. is plotted. Graph C1 (with measuring points in form of diamonds) represents the setup with the addition of the reducing agent 22, solely. Graph C2 (with measuring points in form of triangles) shows the results of the setup with the addition of the activator material 26, solely. Graph C3 (with measuring points in form of squares) shows the results of the setup with the addition of the mixture of the reducing agent 22 and the activator material 26.

As can be seen in the diagram of FIG. 3 for the setup with hydrocarbon (diamonds; graph C1) the conversion of NOx is almost zero at temperatures below approximately 350° C.-400° C. In case of the addition of ether solely (triangles; graph C2) the conversion of NOx is comparatively low over the whole temperature range of approximately 200° C. to 550° C. Only when adding the mixture of the hydrocarbon and ether (squares; graph C3), representing the mixture of the reducing agent 22 and the activator material 26 according to the invention, the temperature threshold for an effective conversion of NOx can be shifted towards lower temperature values of approximately 250° C. enabling an effective NOx conversion over a wider temperature range between approximately 250° C. and 550° C. Thus, the activator material 26 causes an enhancement of a catalytic activity of the catalytic material 14 compared to the catalytic activity without the presence of the activator material 26 at least in a given temperature range (as clearly demonstrated by the progression of the diamonds and the squares in graphs C1 and C3).

The invention can provide an improved exhaust gas after treatment resulting in a less failure-sensitive system.

The invention claimed is:

1. An exhaust gas after treatment system comprising
a catalytic converter arrangement with at least one catalytic material, wherein the catalytic converter arrangement is arranged in an exhaust gas path for an exhaust gas downstream of a combustion engine,
a first tank containing at least one reducing agent,
a second tank containing an activator material and one or more dosing interfaces for feeding the at least one reducing agent for reducing a NOx content in the exhaust gas, the at least one reducing agent comprising at least one hydrocarbon for NOx reduction, wherein the one or more dosing interfaces are arranged to feed the activator material to the exhaust gas, wherein the activator material comprises at least one oxygenated hydrocarbon of an ether out of a group consisting of triglyme, diglyme, monoglyme, diethyl ether (DEE), dipropyl ether, wherein the activator material causes an enhancement of a catalytic activity of the catalytic material compared to the catalytic activity of the catalytic material without the activator material at least in a given temperature range, and
a feedback control for adjustment of an amount of both the at least one reducing agent and the activator material which are fed to the exhaust gas with respect to a temperature of at least one of the exhaust gas and the catalytic material.

2. The exhaust gas after treatment system according to claim 1, wherein the activator material is injected via an injector.

3. The exhaust gas after treatment system according to claim 1, wherein the combustion engine is a diesel engine.

4. The exhaust gas after treatment system according to claim 1, wherein the at least one reducing agent for NOx reduction comprises a fuel.

5. The exhaust gas after treatment system according to claim 1, wherein the activator material causes the enhancement of the catalytic activity of the catalytic material at least at a temperature of the exhaust gas in a temperature range of substantially 200° C. to 500° C.

6. The exhaust gas after treatment system according to claim 1, wherein the catalytic converter arrangement comprises at least a noble metal.

7. The exhaust as after treatment system according to claim 1, wherein the one or more dosing interfaces are arranged in, on or at the combustion engine for post-injection of the at least one reducing agent in one or more cylinders of the combustion engine and/or wherein the one or more dosing interfaces are arranged downstream of the combustion engine in, on or at the exhaust gas path.

8. A method for treating an exhaust gas in an exhaust gas of a combustion engine after treatment system, comprising
adding a reducing agent for reducing a NOx content in the exhaust gas, the reducing agent for NOx reduction comprising at least one hydrocarbon,
adding at least one activator material comprising at least one oxygenated hydrocarbon of an ether out of a group consisting of: triglyme, diglyme, monoglyme, diethyl ether (DEE), dipropyl ether into the exhaust gas to cause an enhancement of a catalytic activity of a catalytic material of a catalytic converter arrangement compared to the catalytic activity of the catalytic material without the at least one activator material at least in a given temperature range, and wherein the reducing agent is an independent component relative to the at least one activator material, and adjusting an amount of both the reducing agent and the at least one activator material which are added to the exhaust gas with respect to a temperature of at least one of the exhaust gas and the catalytic material.

9. A vehicle comprising at least one exhaust gas after treatment system, the at least one exhaust gas after treatment system comprising a catalytic converter arrangement with at least one catalytic material, wherein the catalytic converter arrangement is arranged in an exhaust gas path for an exhaust gas downstream of a combustion engine, a first tank containing at least one reducing agent, and a second tank containing at least one activator material and one or more dosing interfaces for feeding the at least one reducing agent for reducing a NOx content in the exhaust gas, the at least one reducing agent comprising at least one hydrocarbon for NOx reduction, wherein the one or more dosing interfaces are arranged to feed the at least one activator material to the exhaust gas, wherein the at least one activator material comprises at least one oxygenated hydrocarbon of an ether out of a group consisting of: triglyme, diglyme, monoglyme, diethyl ether (DEE), dipropyl ether, wherein the at least one activator material causes an enhancement of a catalytic activity of the catalytic material compared to the catalytic activity of the catalytic material without the at least one activator material at least in a given temperature range, and a feedback control for adjustment of an amount of both the at least one reducing agent and the at least one activator material which are fed to the exhaust gas with respect to a temperature of at least one of the exhaust gas and the catalytic material.

\* \* \* \* \*